(12) United States Patent
Defrancisci et al.

(10) Patent No.: US 6,199,467 B1
(45) Date of Patent: *Mar. 13, 2001

(54) BUCKET ASSEMBLY FOR HOLDING AND CUTTING DRY SPAGHETTI AND METHOD FOR CUTTING DRY SPAGHETTI

(75) Inventors: Leonard Defrancisci, Manhassett; John Alberga, Sea Cliff, both of NY (US)

(73) Assignee: Howden Food Equipment Corp., Santa Barbara, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/018,222

(22) Filed: Feb. 3, 1998

(51) Int. Cl.[7] .................................................. B26D 7/06
(52) U.S. Cl. ............................ 83/86; 83/91; 83/104; 83/165; 83/167; 83/434; 83/435.23; 83/437.4; 83/466.1; 83/566; 83/694; 83/856; 83/932; 99/537; 426/518

(58) Field of Search ................................. 83/23, 29, 86, 83/88, 91, 104, 157, 165, 167, 409, 422, 425, 435, 434, 435.11, 437.4, 466.1, 694, 934, 856, 932, 857, 858, 425.2, 435.2, 105, 437.2, 437.1, 437.5, 435.15, 435.23, 435.21, 409.2, 566; 225/93; 99/450.2, 537; 426/518

(56) References Cited

U.S. PATENT DOCUMENTS

| 689,687 | * | 12/1901 | Newcome | 30/287 |
| 1,576,949 | * | 3/1926 | Carbonard | 83/694 X |
| 2,593,542 | * | 4/1952 | Curioni | 83/167 X |
| 2,649,055 | * | 8/1953 | Borrelli | 83/932 X |
| 2,710,583 | * | 6/1955 | Fava | 83/932 X |
| 2,827,001 | * | 3/1958 | Curioni | 83/932 X |
| 3,099,303 | * | 7/1963 | Anderson et al. | 83/425.2 X |
| 3,114,403 | * | 12/1963 | Rianda | 83/435.2 X |
| 3,150,805 | * | 9/1964 | Surico | 83/29 X |

* cited by examiner

Primary Examiner—Boyer Ashley
(74) Attorney, Agent, or Firm—Darby & Darby

(57) ABSTRACT

An apparatus for cutting dry pasta strands includes a frame and a guide rail mounted to the frame. A bucket is slidably mounted to the guide rail and linearly moves along the guide rail. The bucket has a stepped pasta-receiving channel including a cutting edge. A cutting blade is fixed to the frame for selective sliding engagement against the cutting edge to cut the pasta in half.

6 Claims, 6 Drawing Sheets

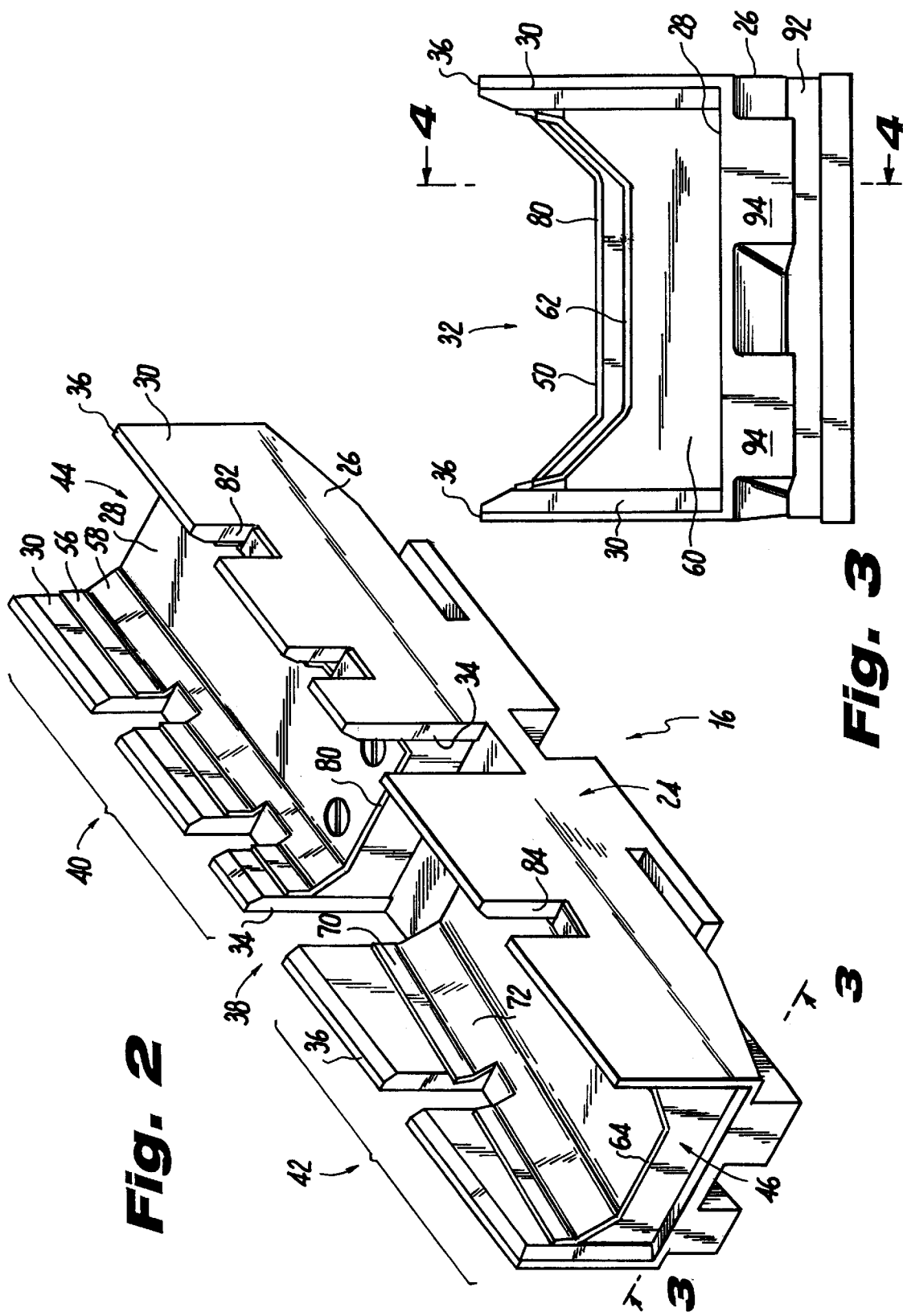

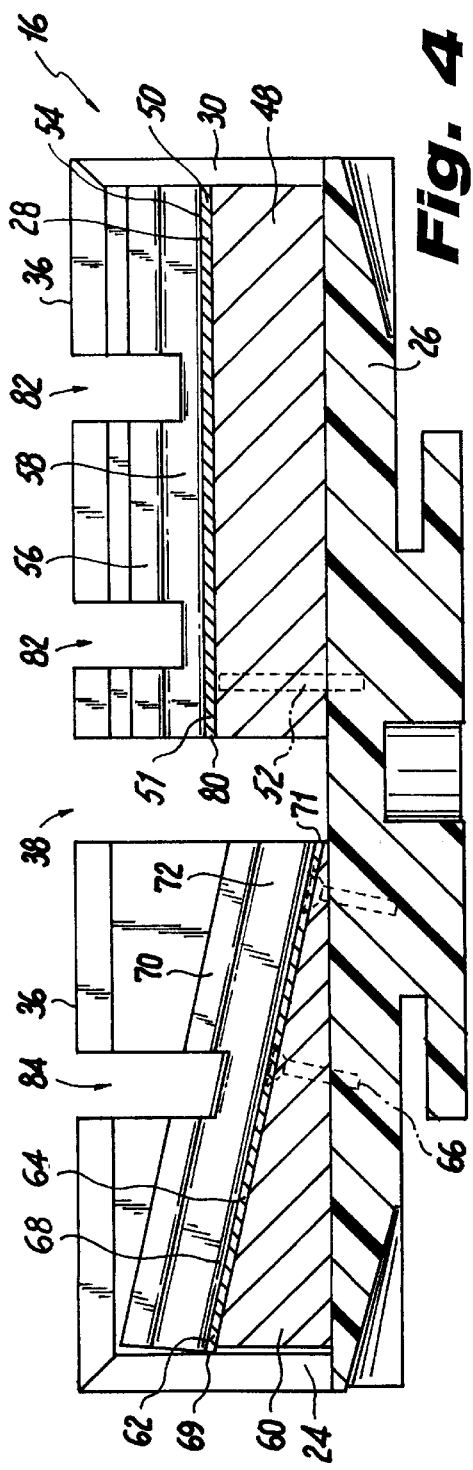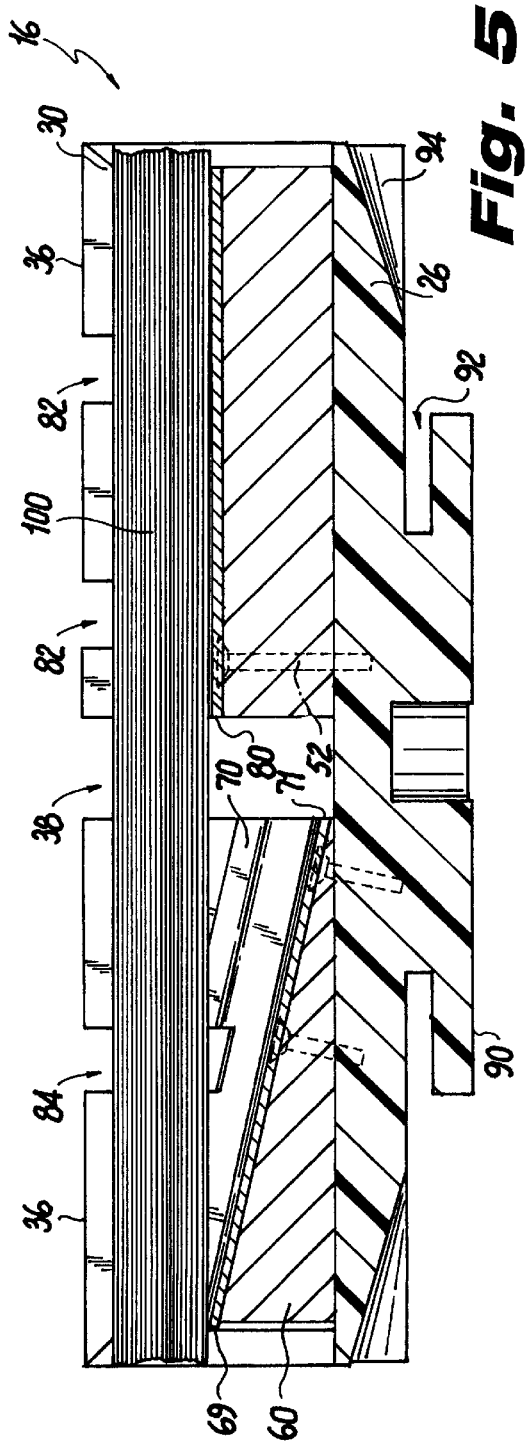

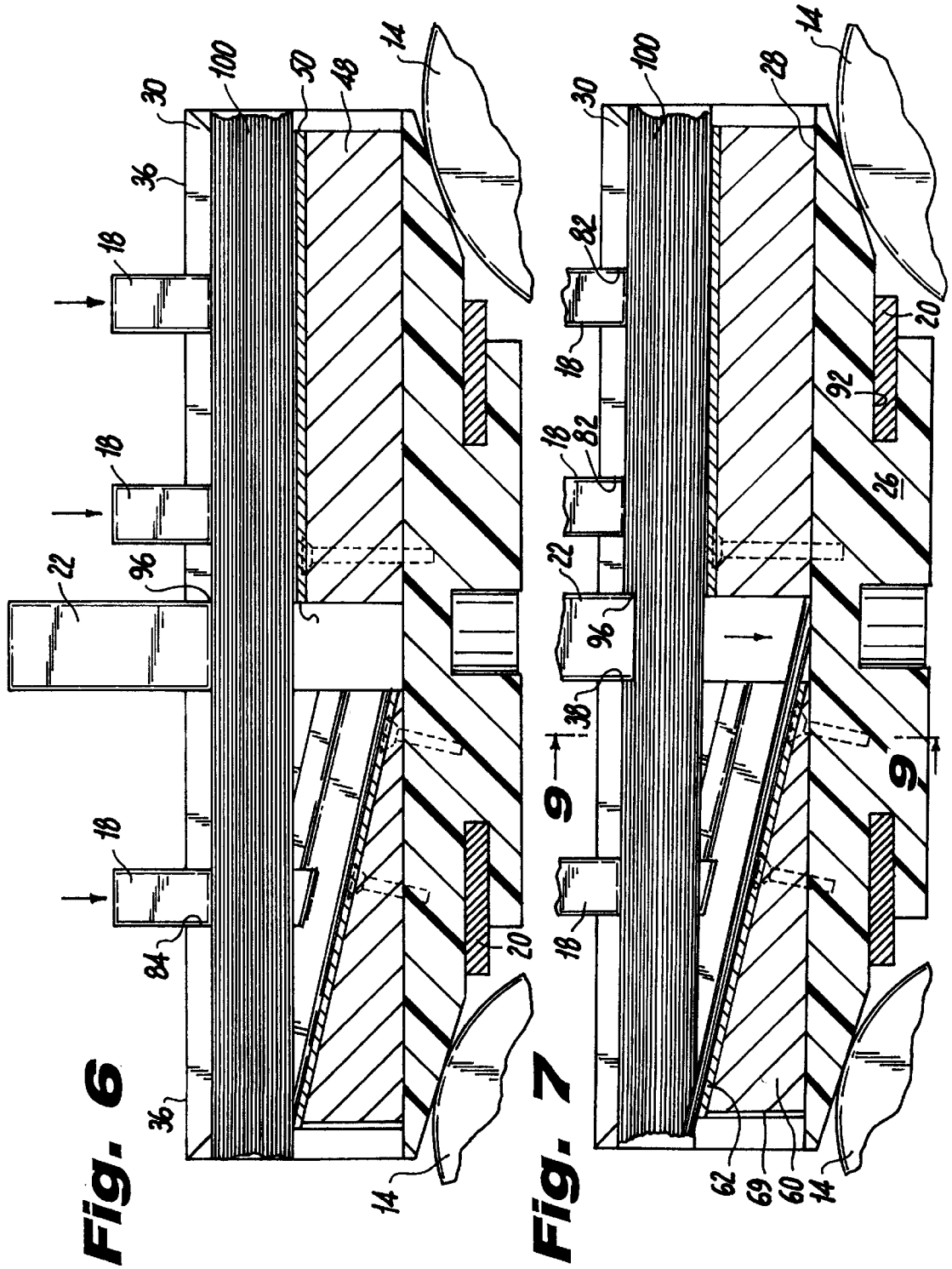

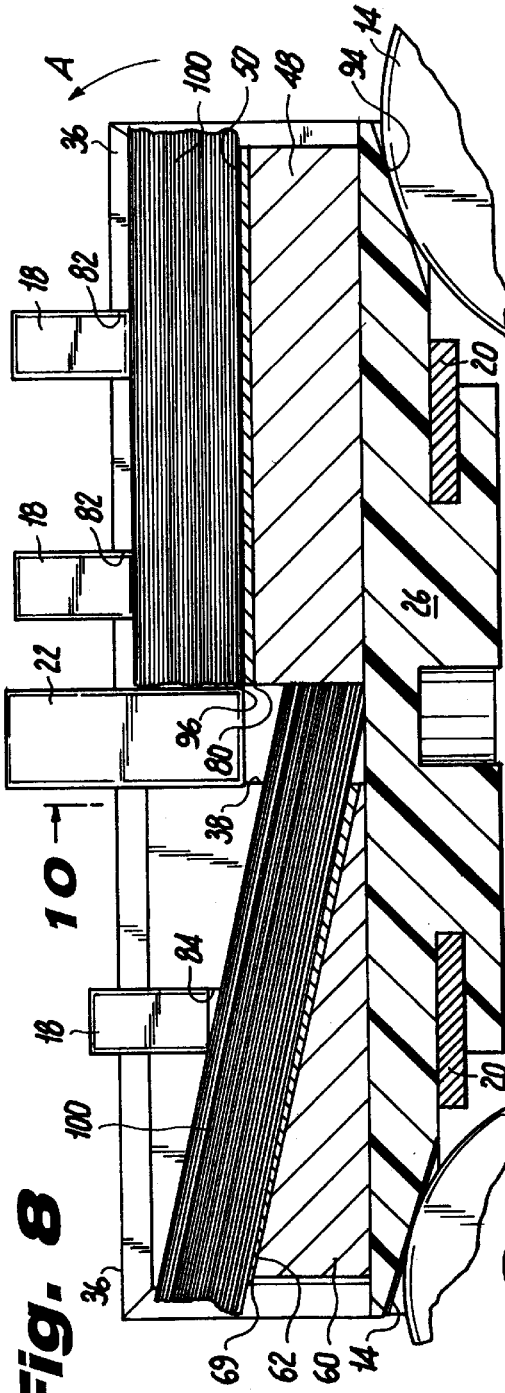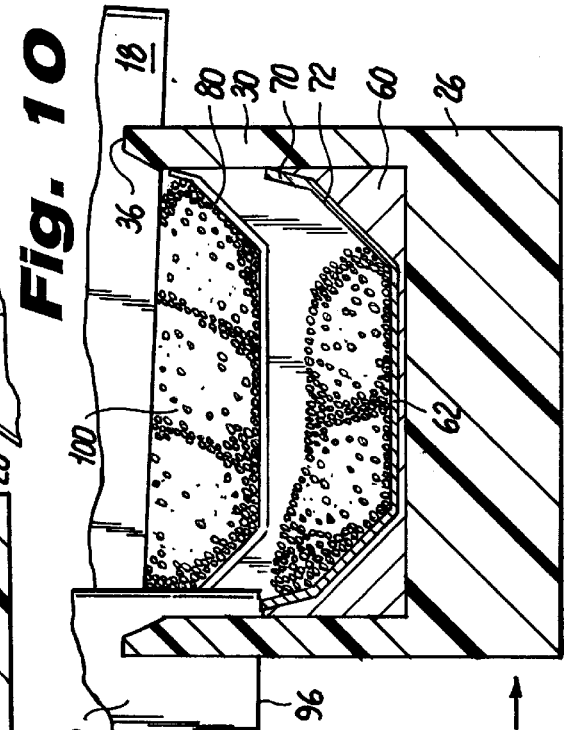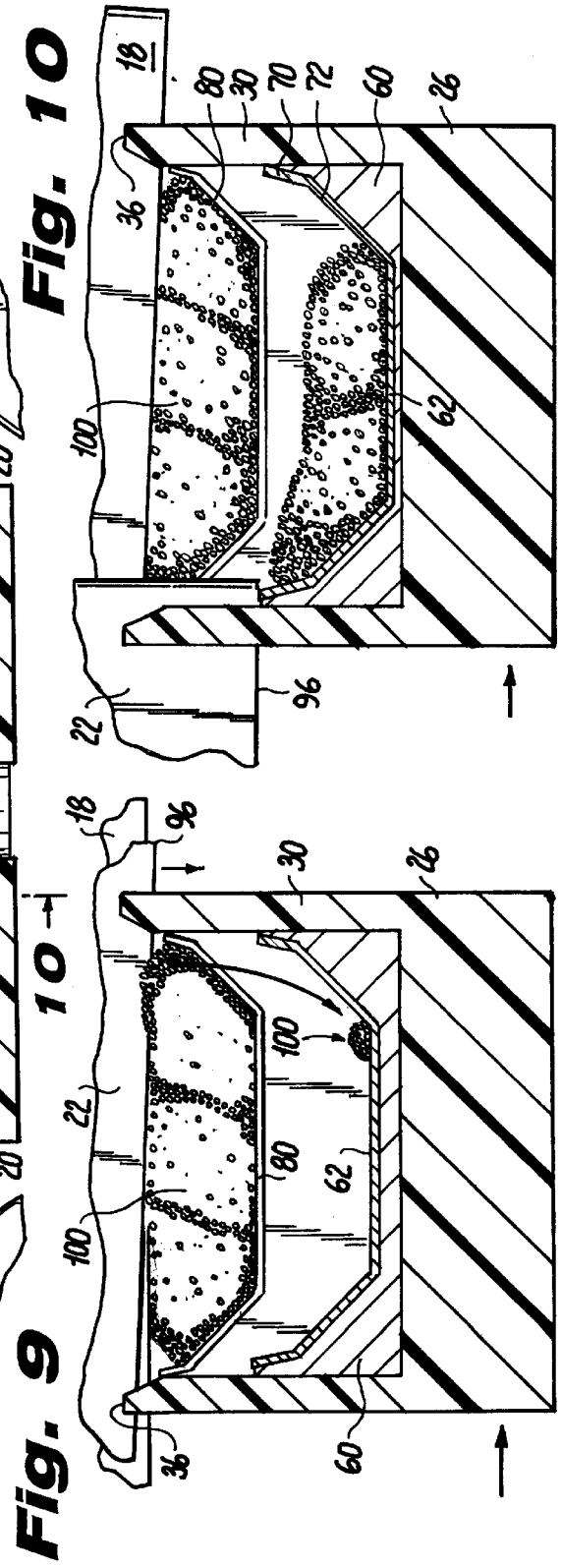

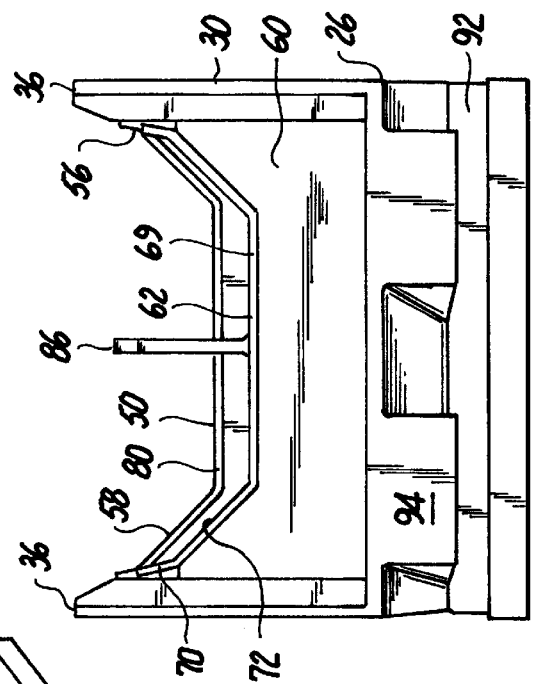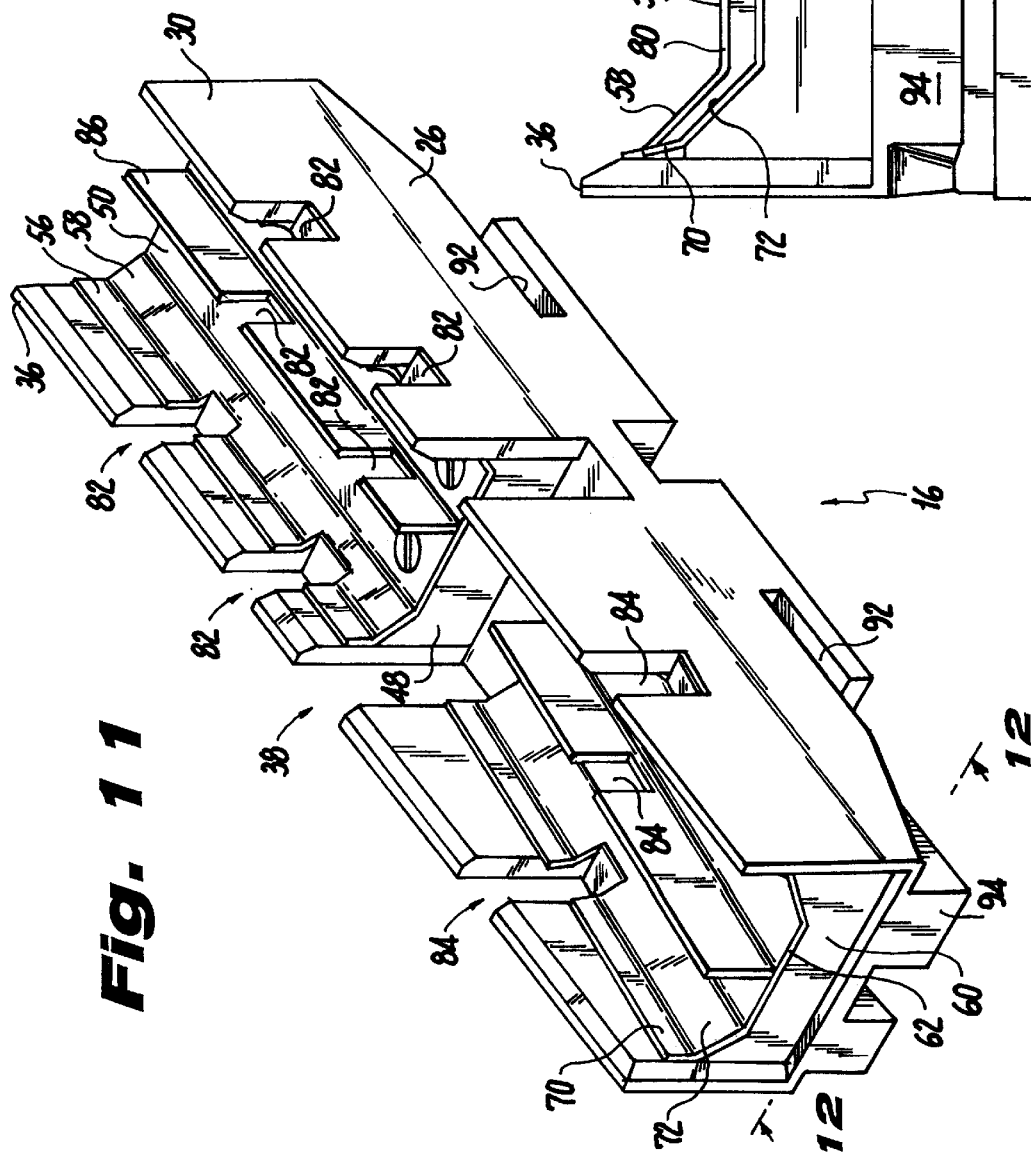

BUCKET ASSEMBLY FOR HOLDING AND CUTTING DRY SPAGHETTI AND METHOD FOR CUTTING DRY SPAGHETTI

BACKGROUND OF THE INVENTION

1. Field of the Invention

This disclosure relates generally to pasta-food processing and handling, and in particular, to a bucket for holding and cutting elongated dry pasta food products, such as spaghetti. This invention also relates to a method for cutting elongated dry pasta.

2. Description of Related Art

Spaghetti pasta is typically extruded when soft and an approximately 45" length of past is hung over a dowel until it is dry. After the spaghetti pasta is fully dried, it is cut at its U-bend end into two 20" long pieces. Each 20" piece is typically cut in half (i.e., into 10" pieces) by rotating disc-shaped blades. The blades may or may not have saw teeth on them. Thereafter, the 10" pieces of pasta are cut in half by another set of rotating discs. However, dry spaghetti is very brittle and, therefore, is difficult to cut especially into pieces that are only about five inches in length. These 5" cut pieces of pasta are also difficult to control for packaging. Further, the cutting of spaghetti from the 10" piece down to a 5" piece frequently causes shattering of the pasta. This is especially true when the blades have saw teeth in them which removes material from the spaghetti during the cutting process. Either type of blade causes shattering of the pasta into uneven cuts and sometime into three or more separate pieces of pasta of various lengths.

Accordingly, it is an object of the present invention to provide a cutting system for dry elongated pasta, such as spaghetti, which overcomes the deficiencies of the prior art.

It is another object of the invention to provide a method for cutting dry elongated pasta that is simple to implement and operate without causing a shattering of the pasta while leaving the cut pasta in an easy to manage condition.

BRIEF DESCRIPTION OF THE DRAWINGS

The features and advantages of the pasta holder and pasta cutting method are explained with reference to the following detailed description of the preferred embodiment of the present invention, taken in conjunction with the accompanying drawings, in which:

FIG. 2 is a perspective view of an empty bucket, according to the invention;

FIG. 3 is a sectional view of the empty bucket, taken along the line 3—3 of FIG. 2, according to the invention;

FIG. 4 is a sectional view of the empty bucket, taken along the line 4—4 of FIG. 3, according to the invention;

FIG. 5 is a sectional view of the bucket of FIG. 4, holding uncut elongate dry pasta;

FIG. 6 is a sectional view of the cutting system, showing a pasta-loaded bucket engaged with the lead screws, the hold-down bars pressing against the loaded pasta, and the cutting blade located just above the pasta, according to the invention;

FIG. 7 is the sectional view of the cutting system of FIG. 6, showing the cutting blade cutting through the secured pasta;

FIG. 8 is the sectional view of the cutting system of FIG. 7, showing the cutting blade cutting all the supported pasta;

FIG. 9 is a sectional view of the carriage, taken along line 9—9 of FIG. 7, showing the cutting blade cutting pasta and cut pasta dropping to a tilted catch-trough, according to the invention;

FIG. 10 is a sectional view of the carriage, taken along line 10—10 of FIG. 8, showing the bucket linearly displaced from the cutting blade along the lead screws with all cut pasta supported by said catch-trough;

FIG. 11 is a perspective view of a bucket, according to a second embodiment of the invention, showing a central divider; and FIG. 12 is a sectional view of the bucket, taken along line 12—12 of FIG. 11, according to the second embodiment.

DETAILED DESCRIPTION OF THE PREFERRED EMBODIMENT

Figure 1:
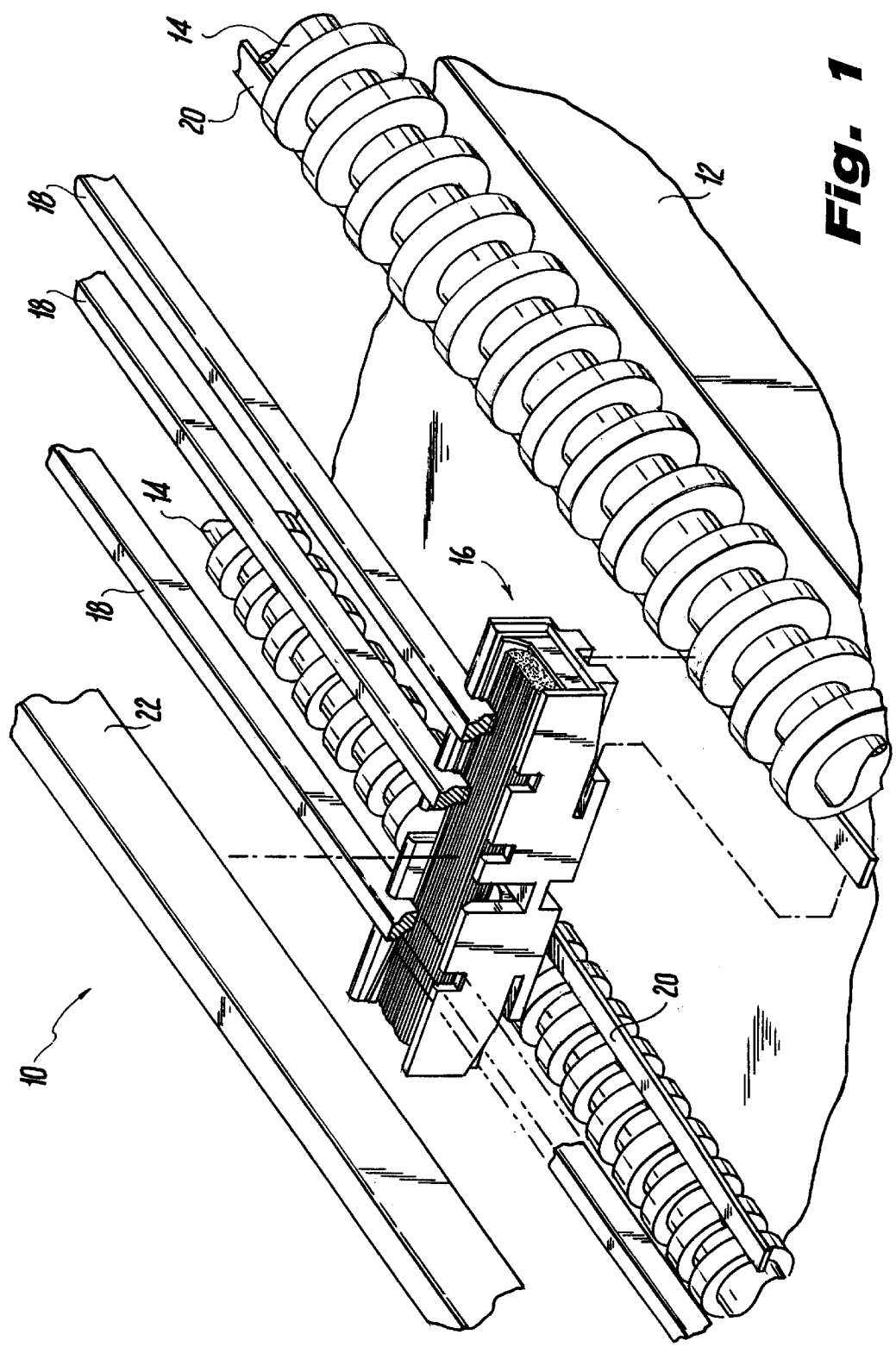
FIG. 1 is a perspective partial assembly view of a cutting system, according to the invention, showing two parallel lead screws, a cutting blade, hold-down bars, and a bucket.

The invention is a cutting system for cutting dry (hard or at least firm) elongated strands of pasta, in particular, spaghetti (and other related varieties; angle hair, linguine, etc.). As described in detail below, the invention utilizes a mechanical shearing action formed by linearly moving a supply of spaghetti (to be cut) with respect to a angularly mounted, stationary cutting blade.

Referring now to FIG. 1, a pasta cutting system 10 is disclosed having a frame 12, two parallel lead screws 14, a bucket assembly 16, gravity bars 18, guide rails 20, and an angularly mounted cutting blade 22. Bucket assembly 16 is adapted to travel linearly along guide rails 20 and also engage with both lead screws so that simultaneous rotation of both lead screws 14 linearly displaces bucket assembly 16 along guide rails 20 and lead screws 14.

As shown in FIGS. 2–5, bucket assembly 16 includes a bucket 24 including a base 26 having a flat floor 28, and two parallel side walls 30. Floor 28 and side walls 30 define a longitudinal channel 32 which, in a preferred embodiment, is preferably about 3.5 inches wide and about 11 inches long and runs the length of bucket 24. Each side wall 30 includes a vertically disposed cutting slot 34, each of which is each positioned approximately in the middle of bucket 24 (measured-longitudinally). Each cutting slot 34 is preferably about ⅞ inches wide and extends between an upper edge 36 of each side wall 30 and floor 28, together defining a cutting channel 38. The width of cutting slot 34 is substantially equal to the width of cutting blade 22.

Cutting channel 38 divides longitudinal channel 32 into two approximately equal portions, a pasta-supporting portion 40 and a pasta-catching portion 42. Support portion 40 of longitudinal channel 32 includes a support-trough assembly 44, while catch portion 42 of longitudinal channel 32 includes a catch-trough assembly 46.

Support-trough assembly 44 includes a support base 48 and a support tray 50. Support tray 50 is preferably made from a metal, such as steel or aluminum and is bonded to an upper surface 51 of support base 48 (using an appropriate adhesive) or otherwise secured thereto using appropriate mechanical fasteners, such as screws 52. Likewise, support base 48 (with support tray 50) is securely attached to support base 26 of bucket 24, preferably using screws 52 that secure both support tray 50 and support base 48 to floor 28 of base 26 so that support tray 50 extends between side walls 30 of support portion 40, a predetermined distance above floor 28 (depending on the thickness of support base 48).

Support tray 50 includes a floor surface 54 that is preferably parallel to floor 28 of base 26, and longitudinally disposed side wall extensions 56 which extend flush against each side wall 30 of bucket 24 a prescribed distance vertically, and preferably the entire length of each side wall 30. Between side wall extensions 56 and floor 54 is integrally formed within support tray 50 a longitudinally disposed beveled wall section 58. Upper surface 51 of support base 48 is preferably shaped to follow (and therefore support) the contours of support tray 50, as shown in FIG. 2.

Similar to support-trough assembly 44, catch-trough assembly 46 includes a catch base 60 and a catch tray 62. Catch tray 62 is also preferably made from a metal, such as steel or aluminum and is bonded to an upper surface 64 of base catch 60 (using an appropriate adhesive) or otherwise secured thereto using appropriate mechanical fasteners, such as screws 66. Catch base 60 (with tray 62) is securely attached to base 26 of bucket 24, preferably using screws 66 that secure both catch tray 62 and catch base 60 to floor 28 of base 26 so that catch tray 62 extends between side walls 30 of catch portion 42, a predetermined distance above floor 28 (depending on the thickness of catch base 60).

Unlike support tray 50, catch tray 62 includes a floor surface 68 that is preferably longitudinally inclined with respect to floor 28 of base 26 so that an outer edge 69 (located adjacent to one end of base 26 of bucket 24) of catch base 60 is thicker (and therefore higher above floor 28) than the opposing inner edge 71 (located adjacent to cutting channel). In other words, catch tray 62 is slanted downwardly towards the middle of bucket 24, as shown in FIGS. 2, 4 and 5. This slant functions to catch freshly cut pasta in such a manner to allow the cut pasta to immediately drop away from the still uncut pasta, and the cutting blade 22, described below.

Catch tray 62 includes longitudinally disposed side wall extensions 70 which extend flush against each side wall 30 of bucket 24 a prescribed distance vertically, and preferably the entire length of each side wall 30. Between side wall extensions 70 and floor surface 68 is integrally formed within catch tray 62, a longitudinally disposed beveled wall section 72. Upper surface 64 of catch base 60 is preferably shaped to follow (and therefore support) the underside contours of catch tray 62, as shown in FIGS. 2 and 3.

An inner edge 80 of support tray 50 which is located adjacent to cutting channel 38, functions as a hardened cutting edge, to assist in the cutting. It is preferred that the distance between floor 28 and outer edge 69 of catch tray 62 is equal to the distance between floor 28 and the entire support tray 50 so that elongated strands of pasta located within longitudinal channel 32 (prior to being cut) may be supported substantially horizontally along their entire length, as shown in FIG. 5. It is important that both ends of the uncut pasta strands be supported prior to and during the cutting process, as shown in FIGS. 5 and 6, and that once cut, the pasta strands are immediately removed (or allowed to fall away) from the cutting blade 22, as shown in FIGS. 7 and 8. The inclined orientation of catch tray 62, as described above, allows the freshly cut pasta to fall away from the cutting blade 22 and thereby minimizes "shattering" of the ends of the pasta strands during the cutting process and allows uncut pasta strands to be cleanly cut by the shearing action between inner edge 80 of support tray 50 and cutting blade 22.

Transversely disposed across opposing side walls 30 of support portion 44 of longitudinal channel 32 are gravity-bar slots 82, which are generally parallel to each other and cutting slot 34, and extend vertically from upper edge 36 of side walls 30 a predetermined distance towards support tray 50, as shown in FIGS. 2 and 4. The purpose of gravity bar slots 82 is to slidingly receive each of gravity bars 18, and allow gravity bars 18 to contact pasta strands located within pasta-supporting portion 40 and press the pasta strands evenly against support tray 50, as bucket 24 is linearly disposed along guide rails 20, during the cutting process, as described below.

Similarly, a single gravity-bar slot 84 is transversely disposed across opposing side walls 30 of pasta-catching portion 42 of longitudinal channel 32. Slot 84 is generally parallel to slots 82 and extend vertically from upper edge 36 of side walls 30 to a predetermined distance above catch tray 62. The function of slot 84 is to slidingly receive a single gravity bar 18 so that pasta strands located within pasta-catching portion 42 of longitudinal channel 32 are supported and gently pressed downwardly against outer edge 69 of catch tray 62 prior to and during the cutting process, as shown in FIGS. 6 and 7, and pressing the pasta strands against catch tray 62 when all strands are cut, as shown in FIG. 8.

Beveled wall section 58 and 72 of both catch tray 62 and support tray 50 help prevent shifting and rolling of the pasta strands, as bucket 24 is linearly displaced with respect to gravity bars 18 and cutting blade 22, stabilizing the pasta strands as they are cut.

According to another embodiment, catch tray 62 and support tray 50 each includes a centrally located, vertically disposed divider 86, running the length of each respective tray, as shown in FIGS. 11 and 12. The purpose of divider 86 is to further stabilize pasta strands as they are cut. In this embodiment, gravity-bar slots 82, 84 extend through each respective divider 86 so that each respective gravity bar 18 may freely drop (preferably only under the influence of gravity, but additional force-applying elements may be used) towards each respective tray 50, 62, as bucket 24 is linearly displaced.

Referring to FIGS. 1–8, a lower surface 90 of base 26 of bucket 24 includes transversely disposed guide channels 92 that are sized and shaped to snugly receive guide rails 20 so that bucket 24 may be smoothly linearly displaced, driven by engagement of adjacent lead screws 14. Opposing longitudinal ends of base 26 of bucket 24 include longitudinally disposed teeth 94, which are sized and shaped to snugly engage with the threads of lead screws 14 so that when guide rails 20 are snugly received by guide channels 92, teeth 94 similarly snugly engage with each respective lead screw 14. With this arrangement, simultaneous rotation of both lead screws 14 forces bucket 24 to be linearly displaced along guide rails 20 in a smooth and even manner. The speed of bucket 24 is directly related to the simultaneous rotation of lead screws 14. Of course, the buckets can be linearly driven by other devices as are known in the art, such as, for example, a chain or belt drive.

In operation, bucket 24 is first positioned at a pasta-receiving point along lead screws 14. Pasta receiving point is a point where all gravity bars 18 and cutting blade 22 are positioned remote from overlapping relationship with side walls 30 so that pasta strands 100 may be easily received by bucket 24 without interference. It is preferred that gravity bars 18 are held above bucket 24 as pasta strands 100 are loaded onto bucket 24 using any appropriate mechanical or pneumatic actuator (not shown).

With bucket 24 located at pasta receiving point, pasta strands 100 to be cut are appropriately apportioned and placed within longitudinal channel 32 using appropriate handling means (not shown or described in detail). Pasta strands 100 are positioned within bucket 24, as shown in FIG. 1 so that the ends of pasta strands 100 are generally flush with opposing bucket ends. Gravity bars 18 are gently, but quickly lowered into their respective slots so that gravity forces each bar 18 down against loaded pasta strands 100. Lead screws 14 are rotated at a predetermined rate which automatically drives bucket 24 and supported pasta strands 100 along guide rails 18 at a predetermined speed. As bucket 24 moves along guide rails 20, pasta strands 100 located within longitudinal channel 32 are snugly pressed against the entire support tray 50 and simultaneously (until cut), against a portion of catch tray 62 which is adjacent to outer end 69, as shown in FIGS. 7 and 8.

Cutting blade 22 is preferably fixed to frame 12 along a vertical plane that is parallel to gravity bars 18, lead screws 14, guide rails 20 and cutting channel 38, and located within a horizontal plane that is disposed at a predetermined angle with respect to lead screws 14 and guide rails 20 so that the distance between cutting blade 22 and bucket 24 progressively decreases at a predetermined rate as bucket 24 is linearly disposed away from the pasta-receiving point along guide rails 20.

As bucket 24 moves along guide rails 20, angled cutting blade 22 eventually enters into cutting channel 38 and effectively forces pasta strands 100 against inner edge 80 of support tray 50 sufficiently to shear pasta strands 100 along inner edge 80. Once cut, pasta strands 100 located within support tray 50 remain generally parallel to floor 28 of bucket 24, while pasta strands 100 located within pasta catching portion 42 freely fall against inclined catch tray 62 (See FIG. 8). Gravity bars 18 will continuously support pasta strands 100 located within pasta-supporting portion before, during and after the cutting process, while pasta strands 100 located within pasta-catching portion 42 of bucket 24 are supported by gravity bar 18 before and after the cutting process. During the cutting process, freshly cut pasta strands 100 located within catch portion of bucket 24 are not contacted by gravity bar 18, until all strands are cut.

At a fully cut point located along lead screws 14, a cutting edge 96 of cutting bar 22 extends below inner edge 80 of support tray 50, at which point all pasta strands 100 will have been cut and cutting bar 22 will have left cutting channel 38 of bucket 24. At this point, gravity bars 18 are either lifted from their respective gravity bar slots or simply slide away from their respective slots as bucket 24 slides past the ends of gravity bars 18. After pasta strands 100 are free from the weight of gravity bars, cut pasta strands 100 located in both support tray 50 and catch tray 62 may be removed using any appropriate handling mechanism (not shown) and further processed and packaged as desired. To remove the cut pasta strands, the stepped shape of the bucket can be taken advantage of by pivoting bucket 24 in the direction indicated by arrow A in FIG. 8 so that the pasta in support tray 50 is combined by sliding on top of the pasta in catch tray 62. Thereafter, the pasta can exit out of the bucket at the end adjacent to catch tray 62.

It is preferred that bucket 24 is molded or otherwise formed from a strong resilient plastic material having low surface friction, such as aluminum and that longitudinal channel 32, side walls 30, floor 28, base 26, guide channels 92 and teeth 94 are integrally formed during the molding process. Gravity-bar slots 82 and cutting channel 38 may either be integrally formed or later machined. Of course, any component of bucket 24 may be formed using any appropriate method.

Support base 48 and catch base 60 are preferably made from aluminum and may further be formed integrally with the forming of bucket 24, or, as described above, attached as a separate component.

Guide bars 18, cutting bar 22, support tray 50, catch tray 62 and bucket 24 are made from a material that is appropriate for handling food. It is preferred that no lubricants are required.

What is claimed is:

1. An apparatus for cutting dry pasta strands comprising:

a frame;

a guide rail mounted to said frame;

a bucket slidably mounted to said guide rail;

means for linearly moving said bucket along said guide rail;

said bucket having a stepped pasta-receiving channel including a cutting edge, said bucket having a floor and two side walls, said step in said pasta-receiving channel being in said floor of said bucket, each side wall including a cutting slot.

2. The apparatus according to claim 1, further comprising a cutting blade fixed to said frame for selective sliding engagement against said cutting edge.

3. The apparatus according to claim 1, wherein said two side walls are parallel with respect to each other.

4. The apparatus according to claim 3, wherein each cutting slot extends between an upper edge of each of said respective side wall and said floor.

5. The apparatus according to claim 3, wherein a beveled wall section is disposed between each side wall and said floor.

6. The apparatus according to claim 3, wherein each side wall includes a plurality of gravity-bar slots.

* * * * *